(12) United States Patent
Kaler et al.

(10) Patent No.: US 7,693,807 B2
(45) Date of Patent: Apr. 6, 2010

(54) MAPPING BETWEEN ANONYMOUS MODULES IN A NETWORK ENVIRONMENT

(75) Inventors: Christopher G. Kaler, Sammamish, WA (US); Richard L. Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 11/304,298

(22) Filed: Dec. 15, 2005

(65) Prior Publication Data

US 2007/0143770 A1  Jun. 21, 2007

(51) Int. Cl.
 *G06N 5/00* (2006.01)
 *G06F 17/00* (2006.01)
(52) U.S. Cl. .................... 706/45; 340/511; 702/183; 717/136
(58) Field of Classification Search .................... 706/45, 706/46; 705/2; 709/242, 224
 See application file for complete search history.

(56) References Cited

U.S. PATENT DOCUMENTS

| | | | |
|---|---|---|---|
| 6,219,832 | B1 | 4/2001 | Buzbee |
| 6,253,370 | B1 | 6/2001 | Abadi et al. |
| 6,874,140 | B1 | 3/2005 | Shupak |
| 6,898,604 | B1 | 5/2005 | Ballinger et al. |
| 2002/0170035 | A1 * | 11/2002 | Casati et al. ................. 717/127 |
| 2004/0143814 | A1 | 7/2004 | de Jong |
| 2004/0177094 | A1 | 9/2004 | Jacobs et al. |
| 2005/0010562 | A1 | 1/2005 | Nagasaka |
| 2005/0015437 | A1 * | 1/2005 | Strait ......................... 709/203 |
| 2005/0021689 | A1 | 1/2005 | Marvin et al. |
| 2005/0076331 | A1 | 4/2005 | Das et al. |
| 2005/0155026 | A1 | 7/2005 | DeWitt, Jr. et al. |
| 2005/0278708 | A1 * | 12/2005 | Zhao et al. ................... 717/136 |
| 2006/0074599 | A1 * | 4/2006 | Emigholz et al. ........... 702/185 |

OTHER PUBLICATIONS

Colin Runciman and David Wakeling "Profiling Parallel Functional Computations (Without Parallel Machines)", pp. 1-14 http://scholar.google.com/url?sa=U&q=http://www.cs.york.ac.uk/ftpdir/pub/colin/ayr93.ps.gz.
George C. Necula and Peter Lee "Safe, Untrusted Agents using Proof-Carrying Code", 29 pages http://www.cs.cmu.edu/afs/cs/cmu.edu/user/necula/www/lncs98.ps.gz.
Gary T. Leavnes, Clyde Ruby, K. Rustan M. Leino, Erik Poll, and Bart Jacobs "JML: notations and tools supporting detailed design in Java", pp. 105-106 2000 http://delivery.acm.org/10.1145/370000/367996/p105-leavens.pdf?key1=367996&key2=0674999311&coll=GUIDE&dl=GUDIE&CFID=68558346&CFTOKEN=27718574.

(Continued)

*Primary Examiner*—David R Vincent
*Assistant Examiner*—Kalpana Bharadwaj
(74) *Attorney, Agent, or Firm*—Workman Nydegger

(57) ABSTRACT

The present invention extends to methods, systems, and computer program products for mapping between anonymous modules in an event environment. Through the use of one or more event type to executable module bindings, a binding/dispatch manager maps events, for example, peer-to-peer, grid, or parallel processing computing events, to appropriate methods for processing the events. When an event is received from an event infrastructure, the binding/dispatch manager refers to annotations (e.g., based on the shape of the parameters) to identify an appropriate method for processing the event. Parameters are transferred to the appropriate method, which processes the parameters and returns any results to the binding/dispatch manager. In some embodiments, the binding/dispatch manager then forwards a response to the event infrastructure.

36 Claims, 2 Drawing Sheets

OTHER PUBLICATIONS

Walid Taha and Tim Sheard "MetaML and Multi-Stage Programming with Explicit Annotations", 33 pgs. http://www.cse.ogi.edu/PacSoft/publications/phaseiiiq8papers/metaml.pdf, Jun. 12-13, 1997.

Klaus-Peter Löhr "Concurrency Annotations", pp. 327-340 1992 ACM http://delivery.acm.org/10.1145/150000/141964/p327-lohr.pdf?key1=141964&key2=9916999311&coll=GUIDE&dl=GUIDE& CFID=68559614&CFTOKEN=10736050, 1992 ACM.

* cited by examiner

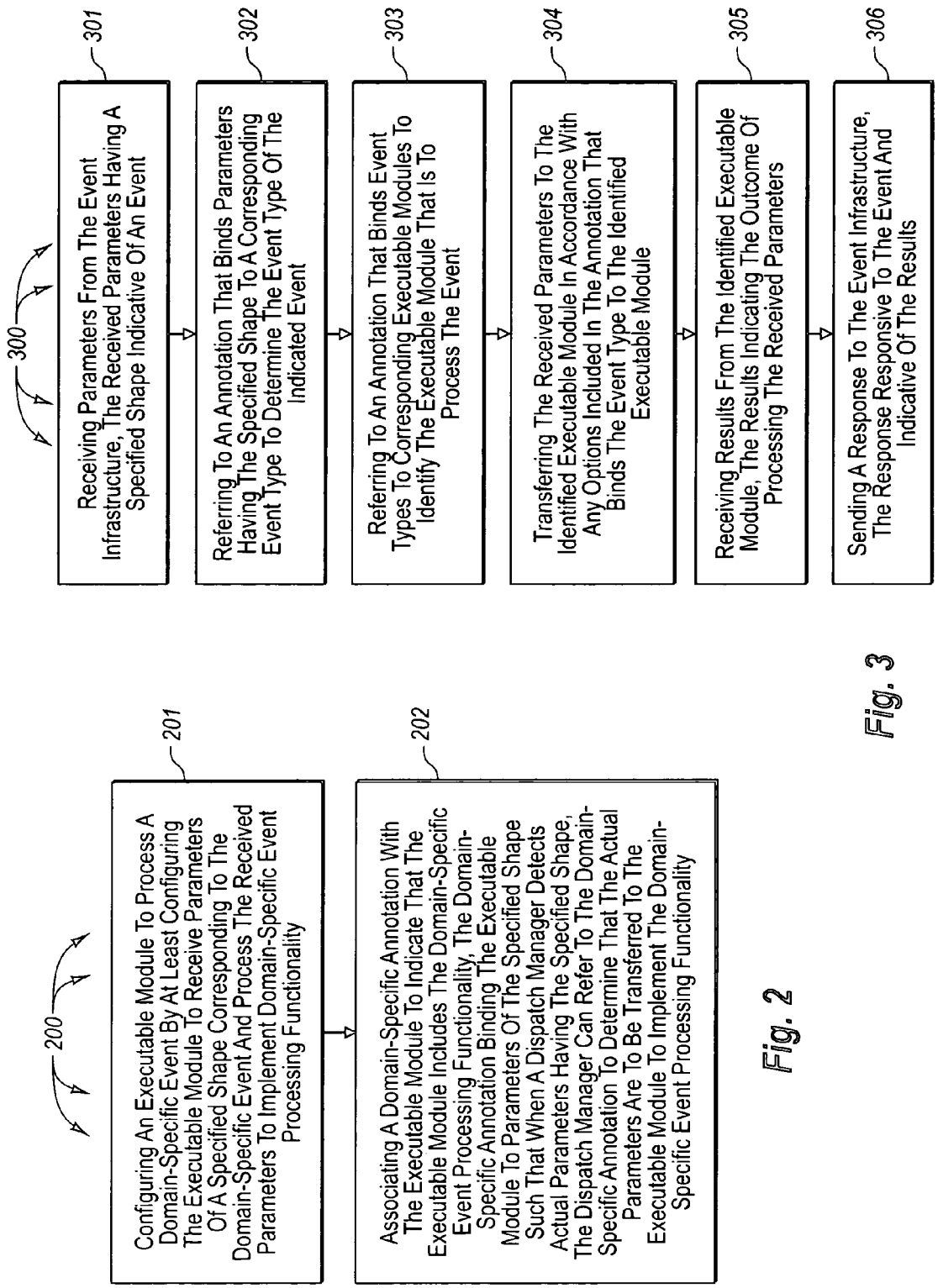

MAPPING BETWEEN ANONYMOUS MODULES IN A NETWORK ENVIRONMENT

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and and/or other electronic devices via wired and/or wireless computer networks.

Many computer processing activities include the invocation of various methods designed to implement the processing activities. For example, an application developer can write a computer program that includes methods for implementing various processing activities. Application developers can write there own methods as well as call pre-existing methods.

Pre-existing methods (as well as other objects) can be included in an object model or Application Program Interfaces ("API") library, which applications interact with to implement desired processing activities. An API library can include registration logic and code to perform processing activities in response to receiving parameters from another module. APIs are typically designed to abstract out various and typically more common tasks, from application development so that an application developer can focus on developing code for more interesting aspects of an application.

Application developers can develop applications against an API library, for example, actively calling methods in the API library from an application. Through development of their own methods and calls to methods in the API library, an application developer can manage a series of events in a desired manner. For example, a messaging API library can include methods for creating connections between computing systems. Thus, an application developer can simply call the methods to establish a connection and is relieved from having to write code for establishing connections. As a result, the application developer can, for example, devote additional time to write code for manipulating messages that are to be transferred across an established connection.

However, inclusion of a method in an API library requires prior knowledge that the method will be useful for processing some event and prior knowledge of the event's semantics. Thus, API libraries typically include methods for processing more common and/or well-known events. On the other hand, less common and less known events are often not included in API libraries. Further, while an API library can include one method for processing a specified event, an application developer may desire to process the specified event in a way that differs from the API library. Accordingly, an application developer is frequently relegated to writing code for additional methods to process (e.g., less common and less known) events.

In many environments API libraries are language or version specific, making the interoperation of methods written in different programming languages (or even different versions of the same programming language) difficult. Thus, an application developer may rewrite a legacy application in a different programming language or a different version of the same programming (at least partially duplicating previously developed code) to utilize more modern API libraries.

Further, in some networked environments, such as, for example, peer-to-peer and grid network infrastructures, similar events and event semantics (e.g., join peer group), are processed in different ways. For example, processing can differ between peer-to-peer and grid infrastructures, between different peer-to-peer infrastructures, and between different gird infrastructures. To appropriately interoperate with a particular peer-to-peer or grid infrastructure, an application may need to include specific code for interoperating with that infrastructure. Requiring the inclusion of infrastructure specific code in an application can be burdensome to an application developer. The application developer typically does not care about the underlying infrastructure where an application will run but is nonetheless forced to include code for interoperation with the infrastructure. Modifying existing code for use with updated APIs can increase the burden on developers of peer-to-peer and grid computing applications.

BRIEF SUMMARY

The present invention extends to methods, systems, and computer program products for mapping between anonymous modules in a network environment. In some embodiments, an executable module is configured to process a domain-specific event by at least being configured to receive parameters of a specified shape corresponding to the domain-specific event and process the received parameters to implement domain-specific event processing functionality. A domain-specific annotation is associated with the executable module to indicate that the executable module includes the domain-specific event processing functionality. The domain-specific annotation binds the executable module to parameters of the specified shape such that when a dispatch manager detects actual parameters having the specified shape, the dispatch manager can refer to the domain-specific annotation to determine that the actual parameters are to be transferred to the executable module to implement the domain-specific event processing functionality.

In other embodiments, an event is processed. Parameters having a specified shape are received from an event infrastructure. An annotation that binds parameters having the specified shape to a corresponding event type is referenced to determine the event type of the indicated event. An annotation that binds event types to corresponding executable modules is referenced to identify the executable module that is to process the event. The received parameters are transferred to the identified executable module in accordance with any options included in the annotation that binds the event type to the identified executable module.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of a method for configuring event processing functionality to work independently of the configuration of modules that utilize the event processing functionality.

FIG. 3 illustrates a flow chart of a method for processing an event independently of a module that issued the event.

DETAILED DESCRIPTION

Figure 1:
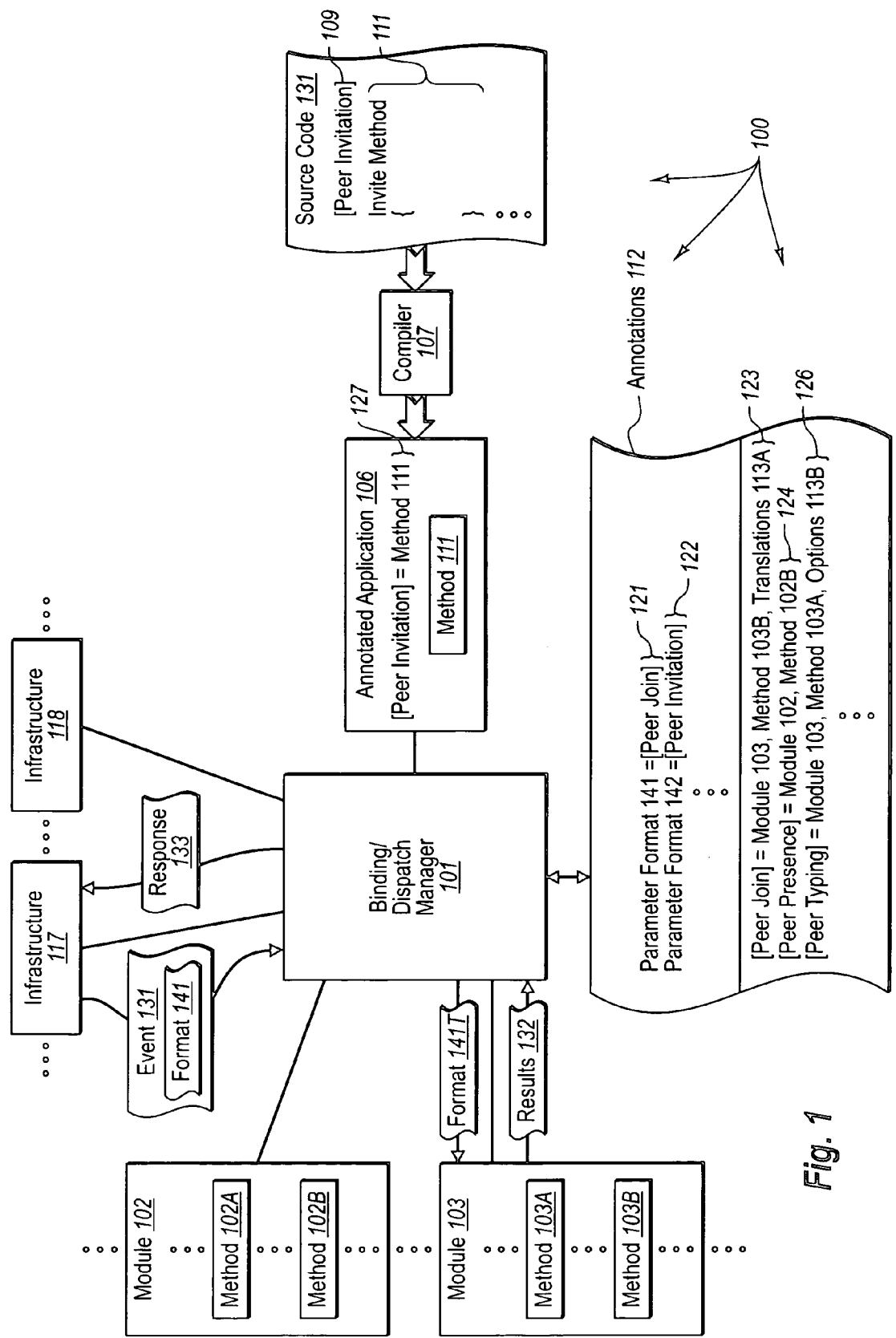
FIG. 1 illustrates a computer architecture that facilitates mapping between anonymous modules in a network environment.

The present invention extends to methods, systems, and computer program product for mapping between anonymous modules in a network environment. In some embodiments, an executable module is configured to process a domain-specific event by at least being configured to receive parameters of a specified shape corresponding to the domain-specific event and process the received parameters to implement domain-specific event processing functionality. A domain-specific annotation is associated with the executable module to indicate that the executable module includes the domain-specific event processing functionality. The domain-specific annotation binds the executable module to parameters of the specified shape such that when a dispatch manager detects actual parameters having the specified shape, the dispatch manager can refer to the domain-specific annotation to determine that the actual parameters are to be transferred to the executable module to implement the domain-specific event processing functionality.

In other embodiments, an event is processed. Parameters having a specified shape are received from an event infrastructure. An annotation that binds parameters having the specified shape to a corresponding event type is referenced to determine the event type of the indicated event. An annotation that binds event types to corresponding executable modules is referenced to identify the executable module that is to process the event. The received parameters are transferred to the identified executable module in accordance with any options included in the annotation that binds the event type to the identified executable module.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

In this description and in the following claims, "domain-specific" is defined as a combination of a particular application or protocol message built on top of a communication protocol, such as, for example, Transmission Control Protocol ("TCP"), HyperText Transfer Protocol ("HTTP"), and Simple Object Access Protocol ("SOAP").

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates mapping between anonymous modules in a network environment. Depicted in computer architecture 100 are components of one or more computers system. The computer systems can be connected to one another by a communication mechanism such as, for example, a network (a Local Area Network ("LAN"), a Wide Area Network ("WAN"), the Internet, etc.) and/or a computer system bus. Thus, the computer systems can receive data from and send data to one another over the communication mechanism. Accordingly, the computer systems can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the communication mechanism.

Computer architecture 100 includes infrastructures 117 and 118. A series of three periods (an ellipsis) represents that other infrastructures can also be included in computer architecture 100. Each infrastructure can be a peer-to-peer computing infrastructure or grid computing infrastructure. When an event occurs within an infrastructure (e.g., a node requests to join a peer group, a grid work request is received, etc.), the infrastructure can transfer the event to binding/dispatch manager 101 for processing.

Binding/dispatch manager 101 maintains mappings between various events and methods that can be used to process the events. When an event is received, binding/dispatch manager 101 can analyze the shape of the parameters accompanying the event (e.g., parameters issued to a method) and identify the appropriate method for processing the event. In some embodiments, binding/dispatch manager 101 refers to annotations (e.g., in one or more of a method, a configuration file, a system registry, etc.) that map between various parameter shapes and corresponding infrastructure events. For example, binding/dispatch manager 101 can refer to binding annotations 112 to determine that a received parameter format (shape) corresponds to a specified infrastructure event.

When a specified infrastructure event is identified, binding/dispatch manager 101 can then identify the appropriate method for processing the specified infrastructure event. Binding/dispatch manager 101 can refer to annotations (e.g., in one or more of a method, a configuration file, a system registry, etc.) that map between various infrastructure events and corresponding methods for processing the infrastructure events. For example binding/dispatch manager 101 can refer to annotation 112 to determine that a specified infrastructure event is to be processed by a specified corresponding method.

Modules including specified event processing functionality can be registered for use with binding/dispatch manager 101 through inclusion in entries of annotations 112. Registration can be performed manually (e.g., by a system administrator) and/or automatically through negotiation between binding/dispatch manager 101 and a module. For example, when a module is written in a computer language that does not support appropriate code annotations, code annotations can be entered manually into annotations 112. On the other hand, when a module is written in a computer language that does support appropriate code annotations, the module can register the annotations (as well as parameter shapes) with binding/dispatch manager 101. During automated registration, the annotations may be copied to annotations 112 and/or retained in the registering module. However, even when a module is written in a computer language that does support appropriate annotations, manually entered code annotations can be entered into annotations 112. Manually entered code annotations can be used to supplement automatically registered annotations or may be used instead of automatically registered annotations.

One or more methods per module can be registered. For example, methods 102A, 102B, etc., can be registered from module 102. Likewise, methods 103A, 103B, etc., can be registered from module 103. A series of three vertical periods (a vertical ellipsis) represents that other methods can be included in and registered from a module.

Annotations 112 can include one or more parameter format-to-event type bindings and one or more event type-to-method bindings. As depicted, annotations 112 includes parameter format to event type bindings 121 and 122. A series of three vertical periods (a vertical ellipsis) represents that other parameter format to event type mappings can also be included in annotations 112. Parameter format-to-event type binding 121 represents that the parameter format 141 corresponds to a Peer Join event. Thus, when a received infrastructure event includes parameters in format 141, binding/dispatch manager 101 can identify the infrastructure event as a Peer Join event. Parameter format-to-event type binding 122 represents that the parameter format 141 corresponds to a Peer Invitation event. Thus, when a received infrastructure event includes parameters in format 142, binding/dispatch manager 101 can identify the infrastructure event as a Peer Invitation event.

Also as depicted, annotations 112 includes event type-to-method bindings 123, 124, and 126. A series of three vertical periods (a vertical ellipsis) represents that other event type-to-method bindings can also be included in annotations 112. Event type-to-method binding-123 represents that Peer Join events are to be transferred to module 103, method 103B (e.g., a method for joining a peer-to-peer network). Thus, when binding/dispatch module 101 identifies an event as a Peer Join event, the event (and corresponding parameters) are transferred to module 103, method 103B.

Event type-to-method binding 124 represents that Peer Presence events are to be transferred to module 102, method 102B (e.g., a method detecting presence on a peer-to-peer network). Thus, when binding/dispatch module 101 identifies an event as a Peer Presence event, the event (and corresponding parameters) are transferred to module 102, method 102B.

Event type to method binding mapping 126 represents that Peer Typing events are to be transferred to module 103, method 103A (e.g., a method for indicating that text is being entered). Thus, when binding/dispatch module 101 identifies an event as a Peer Typing event, the event (and corresponding parameters) are transferred to module 103, method 103A.

Event-to-method bindings can also include various options for appropriate interoperation with and/or customization of a method. For example, event-to-method binding 123 also includes translations 113A. Translations 113A can identify one more parameter translations that are to occur to received parameters before the received parameters are transferred to method 103B. For any return parameters or for a return value, other (and possibly inverse) translations can also be indicated in translations 113A. Translations 113A can be code driven and/or computational. For example, translations 113 can be based on several parameters creating a new parameter to indicate if this is a special order, gold customer, or uses special conditions, etc.

Also depicted, event-to-method binding 126 also includes options 113B. Options 113B can include additional data for customizing a call to method 103A. Based on the values of received parameters, method 103A's processing of an event can be altered using the additional data included in options 113B. For example, depending on the data in a message the message can be mapped differently.

Also depicted, annotated module 106 includes event type-to-method binding 127. Event type-to-method binding mapping 127 represents that Peer Invitation events can be transferred to annotated module 106, method 111 (e.g., a method for inviting a node to join a peer-to-peer network). Thus, when binding/dispatch module 101 identifies an event as a Peer Invitation event, the event (and corresponding parameters) can be transferred to annotated module 106, method 111. Although not depicted in annotated module 106, bindings in annotated modules can also include various options for appropriate interoperation with and/or customization of a method. For example, the information needed for resulting annotation 112 components 113A and 113B

An annotated module can result from compiling source code that includes annotations. Alternately, an annotated module can be interpretable source code that includes annotations. As depicted, source code 131 includes annotation 109 and InviteMethod 111. Compiler 107 can compile source code 131 into annotated module 106 including event type-to-method binding 127 and method 111.

Accordingly, after an event type is identified, binding/dispatch module 101 can refer to an annotations store as well as any annotated modules to identify an appropriate method for processing an event. For example, after identifying a Peer Join event, binding/dispatch module 101 can refer to binding annotations 112, annotated module 106, and any other annotated modules of computer architecture 100, to identify an appropriate module for processing the Peer Join event.

An annotations store can be virtually any mechanism that can contain code annotations. Different annotation stores can exist and can be referred to under different conditions. For example, different annotations stores can exist for different users. In some embodiments, annotations files are referred to at removable storage devices, such as, for example, a thumb drive or dongle. Accordingly, different users can insert different removable storage devices to facilitate different mapping behavior.

FIG. 2 illustrates a flow chart of a method 200 for configuring event processing functionality to work independently of the configuration of modules that utilize the event processing functionality. Method 200 will be described with respect to the components and data in computer system architecture 100. Although described in relation to a peer-to-peer infrastructure, it should be understood that the method 200 can be used to configure event processing functionality in virtually any infrastructure, in addition to peer-to-peer infrastructures. For example, method 200 can be used in a grid infrastructure to configure grid event processing functionality to work independently of the configuration of modules that utilize the grid event processing functionality. Further, method 200 can be used to map processing semantics used on top of an infrastructure. For example, method 200 can be used to map parallel processing events using peer communications to appropriate methods for processing parallel processing events within a peer-to-peer infrastructure.

Method 200 includes an act of configuring an executable module to process a domain-specific event by at least configuring the executable module to receive parameters of a specified shape corresponding to the domain-specific event and process the received parameters to implement domain-specific event processing functionality (act 201). When appropriate, the executable module can also be configured to return one or more results. For example, method 103B (of module 103) can be configured to receive parameters of a shape corresponding to a peer-to-peer function, process the parameters to attempt to implement corresponding peer-to-peer functionality, and return a result indicating if the peer-to-peer function was successful. A peer-to-peer function can correspond to virtually any event possible in a peer-to-peer computing environment, such as, for example, join requests, instant message typing, sending/receiving a message, sending/receiving a file, node presence, etc.

Alternately (or in combination), method 103B (of module 103) can be configured to receive parameters of a shape corresponding to a grid computing function, process the parameters to attempt to implement corresponding grid computing functionality, and return a result indicating if the grid computing function was successful. A grid computing function can correspond to virtually any event possible in a grid computing environment, such as, for example, requesting work, processing work, returning results, scheduling work, etc.

Alternately (or in combination), method 103B (of module 103) can be configured to receive parameters of a shape corresponding to a parallel computing function, process the parameters to attempt to implement corresponding parallel computing functionality, and return a result indicating if the parallel computing function was successful. A parallel computing function can correspond to virtually any event possible in a parallel computing environment, such as, for example, performing a function (e.g., requesting work, processing work, returning results, scheduling work, etc.) in parallel, rendezvousing results, etc.

Accordingly, it may be that module 103 is an existing portion of object code that was previously compiled (or interpreted) to include a method for processing Peer Join events. However, components in infrastructure 117 and 118 may be unaware of module 103. Those nodes transfer events to binding/dispatch module 101, which, as previously described, manages the transfer of event parameters to appropriate methods for processing the event parameters.

Configuration of a module can also include manipulation of the module's source code. For example, through manipulation of source code 131, annotated module 106 can be configured to receive parameters of a shape corresponding to peer-to-peer invitation events, process the parameters to attempt to invite a node to a peer-to-peer network, and return a result indicating if the indication was successful.

Method 200 includes an act of associating an annotation with the executable module to indicate that the executable module includes the domain-specific event processing functionality (act 202). The domain-specific annotation binds the executable module to parameters of the specified shape such that when a dispatch manager detects actual parameters having the specified shape (e.g., of a peer-to-peer, grid, or parallel computing function), the dispatch manager can refer to the domain-specific annotation to determine that the actual parameters are to be transferred to the executable module to implement the domain-specific (e.g., peer-to-peer, grid, or parallel computing) event processing functionality. In some embodiments, a domain-specific annotation also indicates that the executable module is configured to return one or more results (e.g., for a peer-to-peer, grid, or parallel computing function).

For example, event-to-method binding 123 can be associated with method 103B to indicate that method 103B is configured to receive parameters of a shape corresponding to peer-to-peer join events, process the parameters to attempt to join a node to a peer-to-peer network, and return a result indicating if the join was successful. The "[PeerJoin]" portion of event-to-method binding 123 can be bound to the "Module 103, method 103B, Translations 113A" portion of event-to-method binding 123 by the "=" (equal sign). Thus, when parameters of a Peer Join event are detected, event-to-method binding 123 can be used to map the parameters to method 103B (in accordance with translations 113A).

FIG. 3 illustrates a flow chart of a method 300 for processing an event independently of a module that issued the event. Method 300 will be described with respect to the components and data in computer system architecture 100. Although described in relation to a peer-to-peer infrastructure, it should be understood that the method 300 can be used to process an event in virtually any infrastructure in addition to peer-to-peer infrastructures. For example, method 300 can be used in a grid infrastructure to process grid computing events. Further, method 300 can be used to process semantics on top of an infrastructure. For example, method 300 can be used to process parallel processing events using peer communications within a peer-to-peer infrastructure.

Method 300 includes an act of receiving parameters from the event infrastructure, the received parameters having a specified shape indicative of an event (act 301). For example, binding/dispatch module 101 can receive event 131 including parameters in format 141 from infrastructure 117. The parameters in format 141 can indicate that event 131 is a peer-to-peer computing event.

In some embodiments a received event is sourced by the network infrastructure itself. For example, infrastructure 117 may be the original source of event 131. In other embodiments, the parameters are originally sourced at a node and/or application within the network infrastructure. For example, event 131 may be generated by an application in communication with infrastructure 117. Thus, event 131 can be transferred from the application, through infrastructure 117, to binding/dispatch module 101. Accordingly, from the perspective of binding/dispatch module 101, events are received from a network infrastructure, even if the event was sourced at a node and/or application within the infrastructure.

Method 300 includes an act of referring to an annotation that binds parameters having the specified shape to a corresponding event type to determine the event type of the indicated event (act 302). For example, binding/dispatch module 101 can refer to parameter-to-event bindings 121, 122, etc., of annotations 112 to identify that event 131 is Peer Join event.

Method 300 includes an act of referring to an annotation that binds event types to corresponding executable modules to identify the executable module that is to process the event (act 303). For example, binding/dispatch module 101 can refer to parameter-to-event bindings 123, 124, 126, etc., in annotations 112, to parameter-to-event binding 127, and to parameter-to-event bindings in other annotated modules, to identify method 103B as an appropriate method for processing the Peer Join event.

Method 300 includes an act of transferring the received parameters to the identified executable module in accordance with any options included in the annotation that binds the event type to the identified executable module (act 304). Options can include allowance for computing parameters, dropping parameters, translating and/or altering data formats and/or data representations, changing values (e.g., currency, dates, etc.) Generally, options relate to any configuration data used to control how parameters are transferred to the identified method.

For example, binding/dispatch module 101 can transfer parameters of format 141 to method 103B in format 141T. Thus, format 141T is format 141 translated in accordance with translations in 113A. In embodiments where events are sourced at applications and/or nodes within an infrastructure, application attributes can be carried within the event and can be used to map parameter transformations.

Method 103A can process the parameters in format 141T according to executable instructions included in method 103B. It should be understood, that in some embodiments, nodes of infrastructure 117 (and their applications) are not aware of method 103B (or any other method or annotated module in computer architecture 100). Further, it may be that an application sourcing an event that is ultimately received at binding/dispatch module 101 and a method that binding/dispatch module 101 selects to process the event are written in different computer languages or different versions of a computer language. Accordingly, at least in part through the various annotations, binding/dispatch module 101 can manage the processing of a an event between anonymous and/or otherwise incompatible modules.

Upon receiving parameters from binding/dispatch module 101, an identified method can invoke executable instructions to process the parameters to implement specific event functionality, such as, for example, causing a node to join a peer group, etc. Some identified methods are configured such that no results are returned to the calling program at completion. However, other identified methods are configured to return one or more results (parameter values and/or a function result). Thus, these other identified methods can return results to binding/dispatch module 101.

For example, method 103B can send results 132 to binding/dispatch module 101. Results 132 can include one or more returned parameter values and/or a method return value. The return values can indicate the success of performing some action in response to detecting infrastructure event 131. For example, results 132 can indicate if a node was successfully joined to a peer-to-peer infrastructure in response to a Peer Join event.

Accordingly, in some embodiments, method 300 includes an act of receiving results from the identified executable module, the results indicating the outcome of processing the received parameters (act 305). For example, binding/dispatch module 101 can receive results 132 from method 103B.

When appropriate, method 300 also includes an act of sending a response to the event infrastructure, the response responsive to the event and indicative of the results (act 306). For example, binding/dispatch module 101 can send response 133 to infrastructure 117. Response 133 is responsive to event 131 and can include results 132 (which may be translated and/or have options applied). Thus, response 133 can be indicative of a node's success or failure to join to a peer-to-peer infrastructure in response to a received Peer Join event.

It should be understood the embodiments of the present invention can facilitate mapping between anonymous modules in a network environment to implement peer-to-peer, grid, and parallel computing functions (including and in addition to those previously described). Further, as previously described, embodiments of present invention can be used to map events and process events in a variety of infrastructure environments, including peer-to-peer infrastructures and grid infrastructures. Embodiments of present invention can also be used map events and process events for other semantics used along with infrastructure environments.

The follow first code example depicts peer-to-peer infrastructure annotations that can be used to implement an instant messaging application:

```
[PeerGroup=".../IM"]
public class MyIMApplication
{
    public MyIMApplication(PeerEndpoint me)
    {
        // register myself as present
        P2P.Presence(me);
        ...
    }
    [PeerInvitation]
    private void Invite(object sender, PeerInvite invite)
    {
        // accept - note that user confirmation could
        // could be obtained as well before accepting
        P2P.Chat.Accept(invite);
    }
    [PeerPresence]
    private void Presence(object sender, PeerEndpoint pe, bool enter)
    {
        // update any UI illustrating presence data
        ...
    }
    [PeerTyping]
    private void Typing(object sender, PeerEndpoint pe, bool typing)
    {
        // update any UI illustrating typing information
        ...
    }
    [PeerChatMessage]
    private void Message(object sender, PeerMessage msg)
    {
        // update any UI to display the new message
        ...
    }
    private void Send_Click(object sender, EventArgs e)
    {
        ...
        // Send a new message
        P2P.Chat.Send(text);
    }
    private void Input_KeyPress(object sender, EventArgs e)
    {
        ...
        // Note typing state
        P2P.Chat.Typing(text.Length != 0);
    }
}
```

As depicted in the first code example, the annotations provide peer-specific context and code is related to application/business logic except for invocations to initiate activity.

The described mechanisms can also be applied to grid-style applications. Such applications can be divided into three parts: requesters, schedulers, and work processors. Requestors and processors can be application specific, whereas the communication infrastructure and scheduling are typically application neutral. The following second code example depicts grid infrastructure annotations:

```
[GridGroup=".../IM", GridClient]
public class MyGridApplication
{
    public MyGridApplication(PeerEndpoint me)
    {
        // set up
        ...
    }
```

-continued

```
    public void function( )
    {
        // submit a request to the scheduler
        Grid.WorkRequest(...);
    }
    [GridResults]
    private void Done(object sender, GridResults results)
    {
        // process the result
        ...
    }
}
```

The following third code example also depicts grid infrastructure annotations:

```
[GridGroup=".../IM", GridWorker]
public class MyGridWorker
{
    public MyGridWorker(PeerEndpoint me)
    {
        // set up
        ...
    }
    [GridWorkRequest]
    private void Request(object sender, GridRequest req)
    {
        // process a grid request
        ...
        // return results of request
        Grid.Complete(req, ...);
        ...
    }
}
```

It should be understood that a worker can also be a client. For example, a work request may be too big to process or it may be more efficient to process it in smaller pieces. Consequently, a worker may sub-divide a work request and submit those subdivided work requests themselves to the scheduler. They will get assigned sub-workers and results returned to the original worker who then assembles them into a single answer and responds to the original work request.

The same mechanisms can also be extended to parallel applications. For example, by marking the allowed parallelism of a program in source annotations, the infrastructure can automatically parallelize that program's execution using a peer infrastructure. The following fourth code example illustrates a recursive algorithm where peer communication and groups are used to automatically parallelize:

```
[PeerParallel]
public class MyParallelApplication
{
    public MyParallelApplication(PeerEndpoint me)
    { ... }
    [Parallel]
    public int Factorial(int from, int to)
    {
        if ((to - from) > RANGE_CUTOFF)
        {
            // divide into RANGE_CUTOFF units and recurse
        }
        else
        {
            // compute and return result
        }
    }
}
```

The following fifth code example illustrates an alternative style in which an application issues parallel requests and manages responses:

```
[PeerParallel]
public class MyParallelApplication
{
    public MyParallelApplication(PeerEndpoint me)
    { ... }
    [ParallelRequests]
    public Result DoWork(Request req)
    {
        // make calls to parallel tagged functions
        DoFinalWork( );
    }
    [Parallel]
    public int DoFunction(Data d)
    { ... }
    [Rendezvous]
    public int DoFinalWork( )
    { ... }
}
```

Bindings for any of the indicated annotations can also be included in a binding description store. A binding store can be similar to annotations 112, such as, for example a configuration file or system registry, or any other suitable storage facility. In some embodiments, a binding/dispatch manager manages events for various different infrastructure and semantics. Thus, annotations for different types of infrastructures and semantics, for example, peer-to-peer, grid, and parallel processing are included in a common binding description store. Alternately, annotations for different types of infrastructures and semantics, for example, peer-to-peer, grid, and parallel processing, can be included in different binding description stores.

As described, embodiments of the present invention facilitate the use (and reuse) of methods, even when a calling application is not otherwise compatible with the method. Further, events can be processed even when the issuing application has no knowledge of a method used to implement event processing. Accordingly, embodiments permit legacy modules, modules in different languages, etc, to be used to compatibly process events in peer-to-peer, grid, and parallel processing environments.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed is:

1. At a network event processing computer system connected to a plurality of different network infrastructures, each of the plurality of different network infrastructures having different parameter formats used to initiate domain-specific events, a method for configuring domain-specific event processing to work independently of a configuration of executable modules that utilize the domain-specific event processing, the method comprising:

an act of configuring a network event dispatch manager to process events for any of the plurality of different network infrastructures by at least configuring the network event dispatch manager to:

receive parameters of specified formats from network infrastructures included in the plurality of different network infrastructures, the specified formats of received parameters corresponding to domain-specific events within the different network infrastructures, the configuration of executable modules including processing functionality for the domain-specific events;

map specified formats of received parameters to domain-specific events in a parameter-to-network infrastructure event type annotation;

map domain-specific events to appropriate executable modules, configured to process the received parameters for the domain-specific event, in an event type-to-executable module annotation, the mapping including associating domain-specific annotations with appropriate executable modules, the domain-specific annotations binding appropriate executable modules to received parameters of specified formats such that when the network event dispatch manager detects received parameters having a specified format, the network event dispatch manager can refer to domain-specific annotations to determine that the received parameters are to be transferred to an appropriate executable module to implement the domain-specific event;

transfer received parameters appropriate executable modules to process the domain-specific events;

receive results from the appropriate executable modules, the received results indicating the outcome of processing the transferred parameters, including whether the domain-specific events were successful;

create responses from the received results, the responses responsive to the domain-specific events and including the received results; and transfer the responses to the network infrastructures.

2. The method as recited in claim 1, wherein the act of configuring the network event dispatch manager to process domain-specific events comprises an act of configuring the network event dispatch manager to process received parameters to implement least one computing function for each of the plurality of different network infrastructures.

3. The method as recited in claim 2, wherein the act of configuring the network event dispatch manager to process received parameters to implement at least one computing function for each of the plurality of different network infrastructures comprises an act of configuring the network event dispatch manager to process received parameters to implement at least one peer-to-peer computing function and at least one grid computing function.

4. The method as recited in claim 1, wherein the act of configuring the network event dispatch manager to process domain-specific events comprises an act of configuring the network event dispatch manager to process received parameters to implement a specified parallel processing computing function.

5. The method as recited in claim 1, wherein the act of configuring the network event dispatch manager to map domain-specific events to appropriate executable modules configured to process the received parameters for the domain-specific event comprises an act of configuring the network event dispatch manager to associate a parameter format-to-event type binding with the executable module.

6. The method as recited in claim 1, wherein the act of configuring the network event dispatch manager to map domain-specific events to appropriate executable modules configured to process the received parameters for the domain-specific event comprises an act of configuring the network event dispatch manager to associate an event type-to-executable module binding with the executable module.

7. The method as recited in claim 1, wherein the act of configuring the network event dispatch manager to map domain-specific events to appropriate executable modules configured to process the received parameters for the domain-specific event comprises an act of configuring the network event dispatch manager to associate options that control how parameters are transferred to an appropriate executable module within an annotation for the executable module.

8. The method as recited in claim 1, wherein the act of configuring the network event dispatch manager to map domain-specific events to appropriate executable modules configured to process the received parameters for the domain-specific event comprises an act of configuring the network event dispatch manager to associate a domain-specific annotation with an appropriate executable module to indicate that the executable module is configured to implement a peer-to-peer function.

9. The method as recited in claim 1, wherein the act of configuring the network event dispatch manager to map domain-specific events to appropriate executable modules configured to process the received parameters for the domain specific event comprises an act of configuring the network event dispatch manager to associate a domain-specific annotation with an appropriate executable module to indicate that the executable module is configured to implement a grid function.

10. The method as recited in claim 1, wherein the act of configuring the network event dispatch manager to map domain-specific events to appropriate executable modules configured to process the received parameters for the domain-specific event comprises an act of configuring the network event dispatch manager to associate a domain-specific annotation with an appropriate executable module to indicate that the executable module is configured to implement a parallel processing function.

11. The method as recited in claim 1, wherein associating domain-specific annotations with appropriate executable modules comprises annotating source code used to generate executable modules.

12. The method as recited in claim 1, wherein associating domain-specific annotations with appropriate executable modules comprises annotating a configuration file to indicate that executable modules include domain-specific event processing functionality.

13. At a network event processing computer system connected to a plurality of different network infrastructures, each of the plurality of different network infrastructures having different parameter formats used to initiate domain-specific events, a method for uniformly processing a domain-specific event independently of the network infrastructure that issued the event, the method comprising:

an act of receiving parameters from a network infrastructure included in the plurality of different network architectures, the received parameters having a specified format indicative of a domain-specific event within the network infrastructure;

an act of referring to a parameter-to-network infrastructure event type annotation that binds parameters having the specified format to a corresponding event type to determine the event type of the indicated domain-specific event;

an act of referring to an event type-to-executable module annotation that binds the event type of the indicated domain-specific event to an executable module to identify an appropriate executable module that includes processing functionality for the domain-specific event;

an act of transferring the received parameters to the identified appropriate executable module in accordance with any options included in the event type-to-executable module annotation;

an act of receiving results from the executable module, the results indicating the outcome of processing the transferred parameters, including whether or not the domain-specific event was successful;

an act of creating a response from the received results, the response responsive to the domain-specific event and including the received results; and an act of transferring the response to the network infrastructure.

14. The method as recited in claim 13, wherein the act of receiving parameters from a network infrastructure included in the plurality of different network architectures comprises an act of receiving parameters from a peer-to-peer network architecture.

15. The method as recited in claim 13, wherein the act of receiving parameters from a network infrastructure included in the plurality of different network architectures comprises an act of receiving parameters from a grid computing network architecture.

16. The method as recited in claim 13, wherein the act of receiving parameters from a network infrastructure included in the plurality of different network architectures comprises an act of receiving parameters from a parallel processing network architecture.

17. The method as recited in claim 13, wherein the act of receiving parameters from a network infrastructure comprises an act of receiving parameters from a node within the network infrastructure.

18. The method as recited in claim 17, wherein an act of receiving parameters from a node within the network infrastructure comprises an act of receiving parameters from an application at a node within the network infrastructure.

19. The method as recited in claim 13, wherein the act of referring to a parameter-to-network infrastructure event type annotation that binds parameters having the specified shape to a corresponding event type to determine the event type of the indicated domain-specific event comprises an act of referring to a parameter-to-network infrastructure event type annotation stored in a dongle.

20. The method as recited in claim 13, wherein the act of referring to a parameter-to-network infrastructure event type annotation that binds parameters having the specified shape to a corresponding event type to determine the event type of the indicated domain-specific event comprises an act of referring to a parameter-to-network infrastructure event type annotation in a system registry.

21. The method as recited in claim 13, wherein the act of referring to a parameter-to-network infrastructure event type annotation that binds parameters having the specified shape to a corresponding event type to determine the event type of the indicated domain-specific event comprises an act of referring to a parameter-to-network infrastructure event type annotation included in compiled executable code.

22. The method as recited in claim 13, wherein the act of referring to a parameter-to-network infrastructure event type annotation that binds parameters having the specified shape to a corresponding event type to determine the event type of the indicated domain-specific event comprises an act of referring to a parameter-to-network infrastructure event type annotation included in interpretable source code.

23. The method as recited in claim 13, wherein the act of referring to an event type-to-executable module annotation that binds the event type of the indicated domain-specific event to an executable module to identify the appropriate executable module that is to process the domain-specific event comprises an act of referring to an event type event type-to-executable module annotation stored in a dongle.

24. The method as recited in claim 13, wherein the act of referring to an event type-to-executable module annotation that binds the event type of the indicated domain-specific event to an executable module to identify the appropriate executable module that is to process the domain-specific event comprises an act of referring to an event type-to-executable module annotation in a system registry.

25. The method as recited in claim 13, wherein the act of referring to an event type-to-executable module annotation that binds the event type of the indicated domain-specific event to an executable module to identify the appropriate executable module that is to process the domain-specific event comprises an act of referring to an event type-to-executable module annotation included in a compiled executable code.

26. The method as recited in claim 13, wherein the act of referring to an event type-to-executable module annotation that binds the event type of the indicated domain-specific event to an executable module to identify the appropriate executable module that is to process the domain-specific event comprises an act of referring to an event type-to-executable module annotation included in interpretable source code.

27. The method as recited in claim 13, wherein the act of transferring the received parameters to the identified appropriate executable module in accordance with any options included in the event type-to-executable module comprises an act of transferring the received parameters to a method that is not natively compatible with an application in the network infrastructure that sent the received parameters.

28. The method as recited in claim 13, wherein the act of transferring the received parameters to the identified appropriate executable module in accordance with any options included in the event type-to-executable module annotation comprises an act of translating the received parameters for compatibility with the appropriate executable module.

29. The method as recited in claim 13, wherein the act of transferring the received parameters to the identified appropriate executable module in accordance with any options included in the event type-to-executable module annotation comprises an act of customizing the received parameters to cause the appropriate executable module to exhibit custom functionality.

30. The method as recited in claim 13, wherein the act of receiving results from the executable module, the results indicating the outcome of processing the transformed parameters comprises the act of applying at least one of: options and translations included in the event type-to-executable module annotation to the results.

31. The method as recited in claim 1, further comprising:
an act of sending a response to the network infrastructure, the response responsive to the event and indicative of the results, including whether or not the domain-specific event was successful.

32. The method as recited in claim 31, wherein the act of sending a response to the network infrastructure comprises an act of sending a response to a peer-to-peer computing network infrastructure that indicates an action performed in response to a peer-to-peer computing event was successful.

33. The method as recited in claim 31, wherein the act of sending a response to the network infrastructure comprises an act of sending a response to a grid computing network infrastructure that indicates an action performed in response to a grid computing event was successful.

34. The method as recited in claim 31, wherein the act of sending a response to the network infrastructure comprises an act of sending a response to a parallel computing network infrastructure that indicates an action performed in response to a parallel processing event was successful.

35. A network event processing computer system connected to a plurality of different network infrastructures, each of the plurality of different network infrastructures having different parameter formats used to initiate domain-specific events, the network event processing computer system comprising:
one or more processors;
system memory;
one or more computer-readable media having stored thereon computer-executable instructions that, when executed by one of the processors, cause the network event processing computer system to perform the following:
configure a network event dispatch manager module to process events for any of the plurality of different network infrastructures by at least configuring the network event dispatch manager to:
receive parameters of specified formats from network infrastructures included in the plurality of different network infrastructures, the specified formats of received parameters corresponding to domain-specific events within the different network infrastructures, a configuration of executable modules including processing functionality for the domain-specific events;
map specified formats of received parameters to domain-specific events in a parameter-to-network infrastructure event type annotation;
map domain-specific events to appropriate executable modules, configured to process the received parameters for the domain-specific event, in an event type-to executable module annotation, the mapping including associating domain-specific annotations with appropriate executable modules, the domain-specific annotations binding appropriate executable modules to received parameters of specified formats such that when the network event dispatch manager detects received parameters having a specified format, the network event dispatch manager can refer to domain-specific annotations to determine that the received parameters are to be transferred to an appropriate executable module to implement the domain-specific event;
transfer received parameters to appropriate executable modules to process the domain-specific events;
receive results from the appropriate executable modules, the received results indicating the outcome of processing the transferred parameters, including whether the domain-specific events were successful;
create responses from the received results, the responses responsive to the domain-specific events and including the received results; and
transfer the responses to the network infrastructures.

36. The method as recited in claim 1, wherein:
the act of receiving parameters from a network infrastructure included in the plurality of different network architectures comprises an act of receiving parameters having a domain-specific format from one of: a peer-to-peer network infrastructure, a grid network infrastructure, and a parallel processing network infrastructure; and the act of referring to a parameter-to-network infrastructure event type annotation that binds parameters having the specified format to a corresponding event type comprises an act of referring to a parameter-to-network infrastructure event type annotation to determine the corresponding event type of the indicated domain-specific event, the event type selected from among: a peer-to-peer network event, a grid network event, and a parallel processing network event respectively.

* * * * *